E. R. BRISTOL.
Relief-Valves.

No. 151,956. Patented June 16, 1874.

WITNESSES.

INVENTOR.
Edmund R. Bristol

UNITED STATES PATENT OFFICE

EDMUND R. BRISTOL, OF MILWAUKEE, WISCONSIN.

IMPROVEMENT IN RELIEF-VALVES.

Specification forming part of Letters Patent No. 151,956, dated June 16, 1874; application filed April 8, 1874.

*To all whom it may concern:*

Be it known that I, EDMUND R. BRISTOL, of Milwaukee, in the county of Milwaukee, in the State of Wisconsin, have invented certain Improvements in Relief-Valves, of which the following is a specification:

My invention has for its object the relief of the hose of a fire-engine from too much pressure, and it is accomplished by a valve which is constructed with a spring, which will yield when there is too much pressure, and let the water be conveyed back again to the place where it is taken from.

Figure 1:
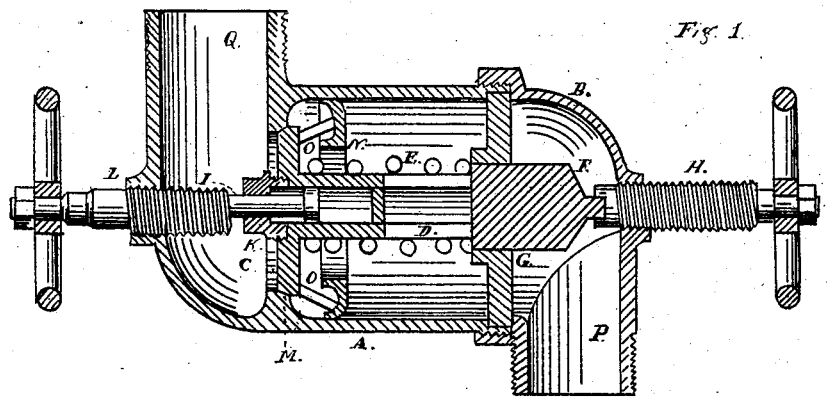
Figure 2:
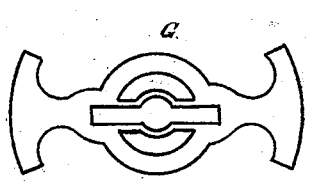

Figure 1 is a sectional view of my invention, and Fig. 2 is a view of the cross-bar which holds or steadies the stop on the top of the spring.

A is the valve-case; B, the cover screwed onto the end of it; C, the main valve sitting on the seat; D, the valve stem; E, a spring on the valve-stem; F, a stop which rests on the spring E and over a slot in the stem; G, a keeper across the valve-case, through which the valve-stem slides; H, a stem with screw on it, passing through the cover and screwing through it and resting on the stop F, regulating the pressure on the valve; I, a stem at the other end of the valve-case, with a head on it, passing into a hollow in the bottom of the valve, and protected from coming out by the nut K screwed into the valve, through which passes stem I; L, screw on the stem I, securing it to case A. This stem is for the purpose of holding the valve firmly on its seat whenever the valve is not wanted to operate. M, the valve-seat; N, a ring round the outside of valve C, and filling the case A, and secured to valve C by arms. The water, when the valve C is raised, rushes out and strikes against this ring N, which is hollowed out on the under side and helps to keep it pressed up, and then passes between the valve C and ring N, through the opening O. O, an opening for water or steam to pass through into the body of the valve-case. This valve is operated and controlled by screwing down the stem H, and thus pressing on stop F, so as to hold the spring down hard enough to hold the valve onto its seat, so that the water or steam, when it is pressing above the pressure on the spring, will raise the valve and escape.

I claim as my invention—

Valve C, valve-stem D, ring N, with openings O, spring E, and stop F, in combination with keeper G and stem H, substantially as described.

EDMUND R. BRISTOL.

Witnesses:
Q. A. OLIVER,
J. B. SMITH.